Oct. 1, 1929.    E. E. SCOTT    1,729,800
THEFT ALARM OR SIGNAL FOR MOTOR DRIVEN VEHICLES
Filed Oct. 27, 1924    3 Sheets-Sheet 1

Inventor
Ernest E. Scott
By [signature] Talbert
Attorney

Oct. 1, 1929.   E. E. SCOTT   1,729,800
THEFT ALARM OR SIGNAL FOR MOTOR DRIVEN VEHICLES
Filed Oct. 27, 1924   3 Sheets-Sheet 2
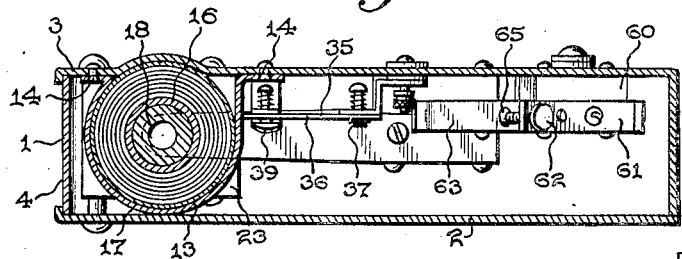
Fig. 3.
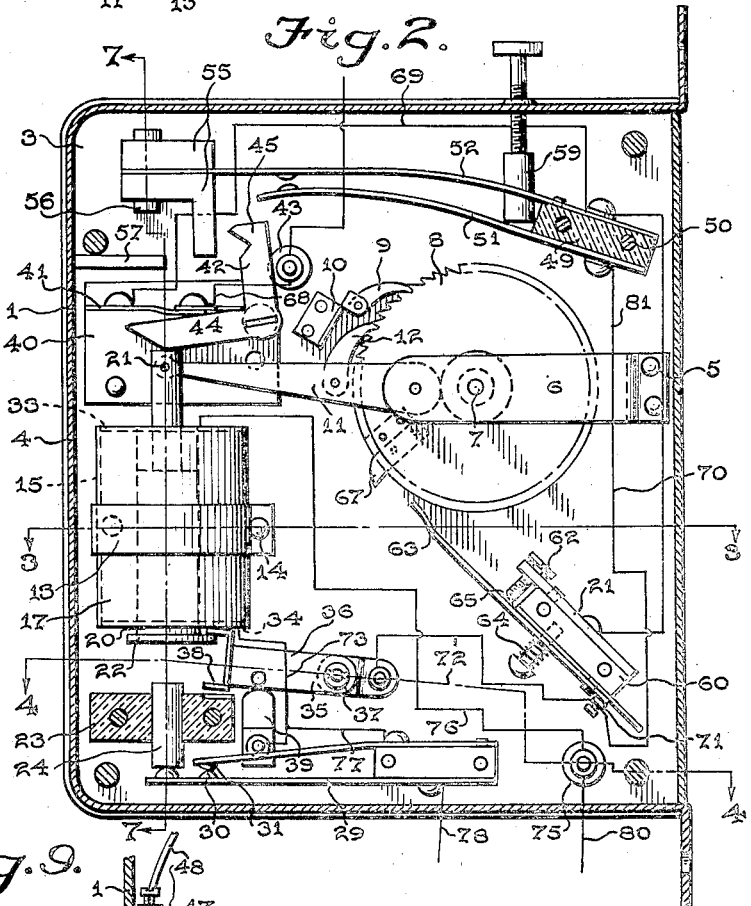
Fig. 2.
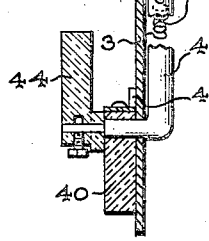
Fig. 9.
Fig. 10.
Inventor
Ernest E. Scott
By [signature]
Attorney

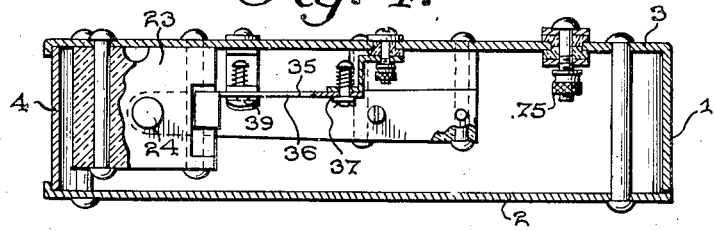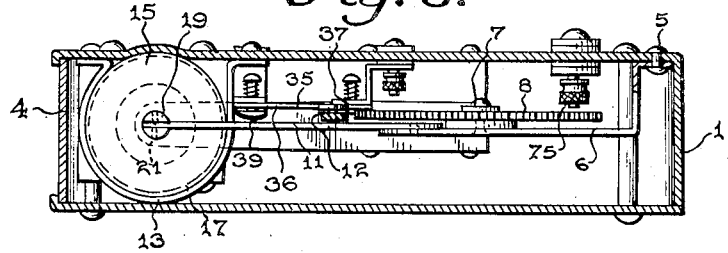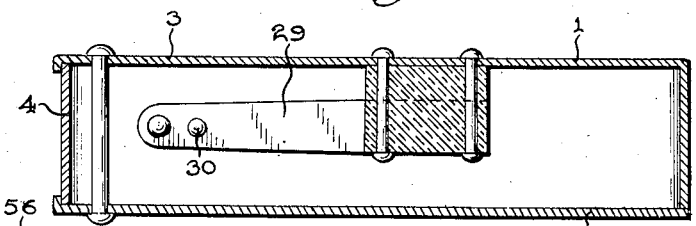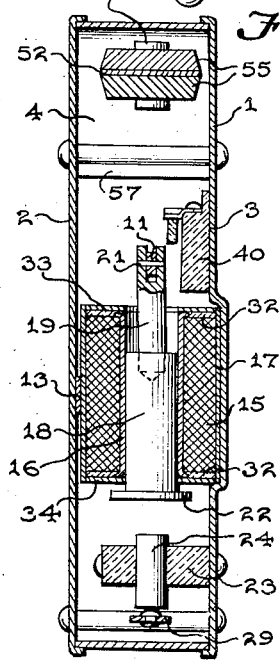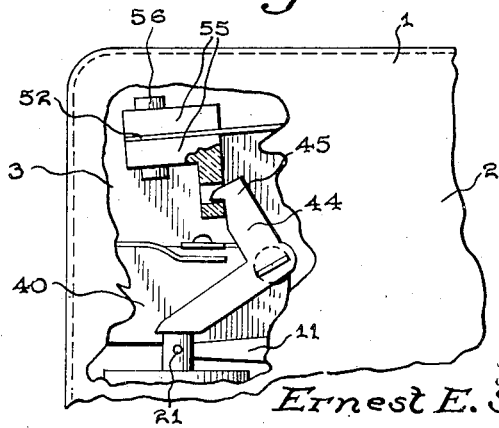

Patented Oct. 1, 1929

1,729,800

UNITED STATES PATENT OFFICE

ERNEST E. SCOTT, OF DENVER, COLORADO, ASSIGNOR TO ELECTRIC ALARM COMPANY, OF DENVER, COLORADO, A CORPORATION OF COLORADO

THEFT ALARM OR SIGNAL FOR MOTOR-DRIVEN VEHICLES

Application filed October 27, 1924. Serial No. 746,171.

The object of the invention is to provide a device for use in connection with either visual or audible signals and adapted to set the same in operation upon the mebchanism being subjected to the slightest vibration, as by stepping on the running-board or starting the engine of a motor vehicle, if the device be used thereon, or in tampering with or actuating any closure of a room or building if the device be installed therein; to provide a mechanism which, if once actuated, will operate the signal intermittently for a fixed length of time and cease, or continue the operation for a further fixed interval of time if the vibration continues after the first period of operation; and to provide a construction in which the assembly of parts is partly mechanical and partly electrical, so that the current employed for operating the signal may also be the prime actuating medium of the device.

With this object in view, the invention consists in a construction and combination of parts of which a preferred embodiment is illustrated in the accompanying drawings, wherein:

Figure 2 is a view partly in side elevation and partly in section.

Figures 3 and 4 are respectively transverse sectional views on the planes indicated by the lines 3—3 and 4—4 of Figure 2.

Figure 1:
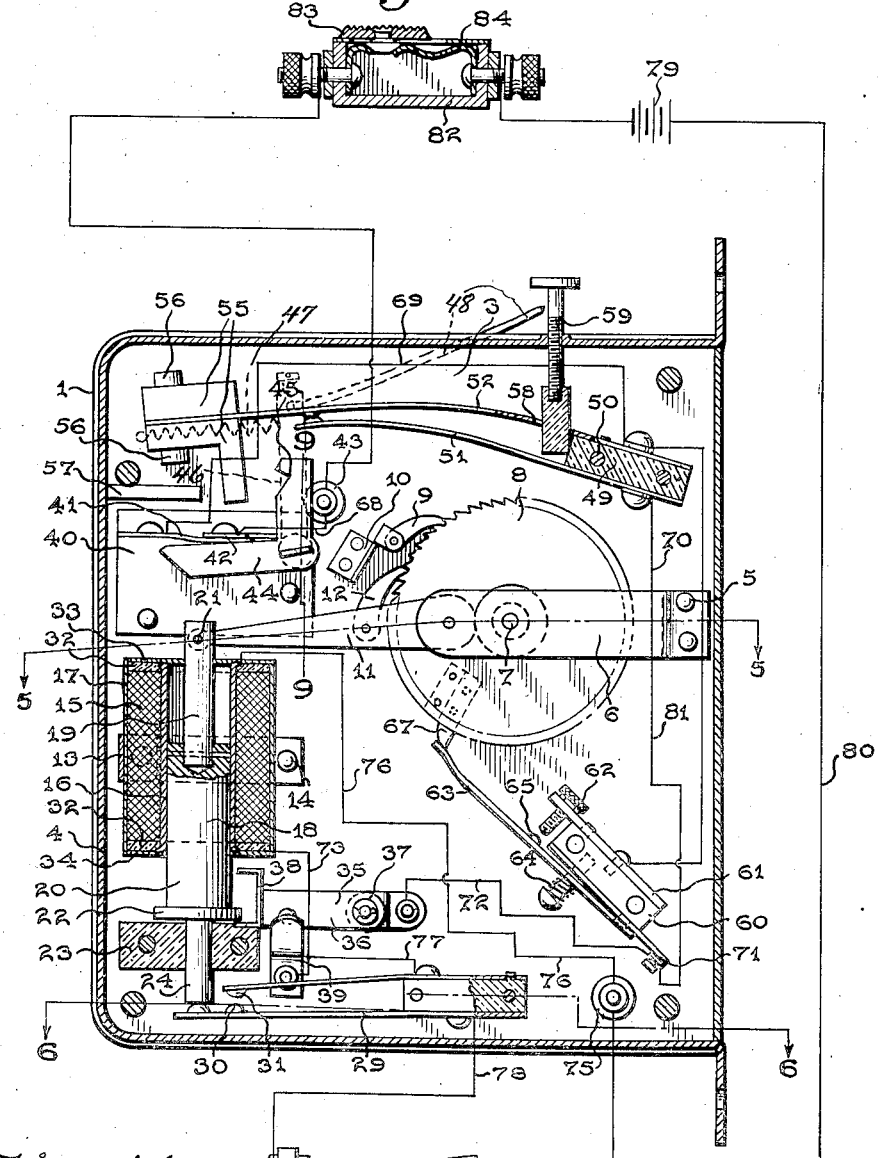
Figure 1 is a vertical sectional view of the invention.

Figures 5 and 6 are respectively transverse sectional views on the planes indicated by the lines 5—5 and 6—6 of Figure 1.

Figure 7 is a transverse vertical sectional view on the plane indicated by the line 7—7 of Figure 2.

Figure 8 is a detail elevational view partly broken away showing the latching means to prevent actuation of the device.

Figure 9 is a detail sectional view on the plane indicated by the line 9—9 of Figure 1.

Figure 10 is a detail perspective view illustrating the supporting bracket employed in connection with the means to prevent retrograde movement of the switch opening member.

Figure 11:
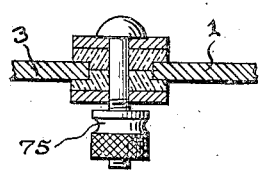

Figure 11 is a detail sectional view illustrating the binding post mounting.

The casing 1 housing the entire mechanism comprises the back pieces 2 and 3, one of which carries the electrical means for transmitting power to the alarm or signal, there being a band 4 with which the front and back pieces of the housing engage with feet on the band for the purpose of mounting the housing in position on the vehicle or other vibrating member. The front and back pieces are flanged in the manner shown for the purpose of engaging with the band to hold the band secure.

Secured on the interior of the housing, as at 5, is a supporting arm 6 in which a shaft 7 is mounted, said shaft being, in turn, mounted in a bearing of the back piece 3 of the housing, and mounted upon the shaft is a ratchet wheel 8. A suitable pawl or detent 9 is mounted upon a bracket 10 and engages the teeth of the ratchet to prevent retrograde movement thereof. The bracket 10 is, in turn, mounted on the back piece 3 of the housing. A movable arm 11 is pivotally supported on the shaft 7 and is provided with a pawl 12 to engage with the teeth of the ratchet for the purpose of imparting intermittent motion to the ratchet.

A strap or support 13 secured at 14 to the back piece 3 is provided for the purpose of supporting a solenoid 15. This solenoid comprises a brass tubing 16 on which the wire of the solenoid is wound. A steel housing 17 is fitted over the wire and serves not only to guard the same but to provide a magnetic path for the flux. The solenoid includes a plunger 18 which is operable in the tubing for movements perpendicularly. The plunger has a terminal extension 19 constructed of any suitable insulating material, such as bakelite or similar material. The terminal extension is pivoted at 21 to the plunger portion of the arm 11. The lower end 20 of the plunger is flanged, as at 22, for a purpose hereinafter stated.

In an insulating support 23 of bakelite or other suitable material, a bakelite plunger 24 is mounted and with which the lower extremity of the plunger engages. A support 25 of bakelite or other insulating material is secured to the back plate of the housing in any manner and carries a circuit closed which, in turn, actuates the alarm or signal or horn proper 27 for the purpose of giving warning to the owner of the vehicle of an attempt to burglarize the vehicle. This circuit closer comprises the spring members 28 and 29 which have contacts 30 and 31.

When the plunger 24 is engaged by the solenoid plunger, the former moves downwardly, depressing the spring 29 and thereby disconnects the contacts 30 and 31, and upon the solenoid plunger rising, the spring 29 being of greater tension than the weight of the plunger 24, the latter rises and the contacts 30 and 31 are again restored into engagement. These movements consecutively occur, causing the horn or other alarm or signal to impart consecutive blasts or sounds. Obviously, the owner upon hearing the alarm will quickly return to and reclaim the vehicle and, if possible, aid in the capturing of the thief.

Insulating plates 32 are mounted on the brass tubing within the steel housing 17, there being thin washers 33 and 34 at the opposite ends of the steel housing or casing for the continuity of the magnetic circuit, the former being constructed of insulating material act as a protective medium for the ends of the bobbin of wire.

The switch 35 comprises a blade 36 pivotally supported at 37 and the end of the blade has a U-shaped extremity 38. The flange 22 of the plunger 18 plays between the arms of the U-shaped member 38. When the plunger of the solenoid rises, the flange 22 engages with one arm of the U-shaped extremity 38 and moves the switch blade on its pivot, disconnecting it from the electric terminal member 39. Upon downward movement of the plunger of the solenoid, the flange engages with the opposite arm of the U-shaped extremity and restores the switch blade in engagement with the electric terminal member 39, thereby again closing the circuit. In this manner the circuit to the solenoid makes and breaks.

A block 40 constructed of insulating material, preferably bakelite, is secured on the back plate 3, and mounted thereon are contact terminal plates 41 and 42, and 43 designates a binding post constructed as shown in Figure 11. A rocker 44 is mounted in a bearing of the bakelite block 40 (which is secured to the back plate 3 of the casing) and movable therewith at one end is an angle arm 45, one leg of which is employed to bear against the extension 19 to retain the plunger of the solenoid in its lower position. Connected with the rocker 44 is an arm 46 with which a coil spring 47 cooperates to hold one leg of the angle arm 45 against the extension 19 to hold the plunger of the solenoid depressed, the lower end bearing upon the plunger 24 which, in turn, bears upon the spring 29 and separates the two contacts 30 and 31, in which case the circuit is opened.

This position of the parts is maintained as long as the owner of the car occupies the driver's seat, but at any time that the car is empty and the owner has left the same parked, a suitable wire 48 attached to the arm 46 may be pulled, the wire being fastened securely in any suitable manner to a member (not shown) located in a secretive place so as to hold the arm in such a position that the angle arm 45 may be held out of engagement with the extension 19 of the solenoid plunger. With the parts in such positions, the alarm device is ready to operate just as soon as the body of the vehicle is vibrated.

A support 49 of suitable insulating material, such as bakelite, is secured at 50, to the back plate 3 of the housing, and secured to the support 49 are circuit closing spring members 51 and 52 which have interengaging contacts 53 and 54. The spring member 52 is much longer than the spring member 51 and is provided with suitable weight members 55 on its extremity. The remote faces of the weight members have rubber bumpers 56, one of which engages with the wall of the housing when the spring 52 vibrates in one direction, while the other bumper or cushion engages with an abutment 57 projecting from the end wall of the housing, that is, when the spring member 52 vibrates.

The spring member 52 has an opening 58 through which one end of a thumb-screw 59 engages. This thumb-screw 59 is threaded in the wall of the housing and the inner extremity has a foot of insulating material which bears against the spring member 51. By means of the thumb-screw the separation or spacing of the spring members 51 and 52 may be effected. This will regulate the throw of the spring member in making contact. Thus, these members may be adjusted for either relatively long or relatively short swinging movement of the spring member 52, so as to make the device sensitive to slight vibrations or otherwise, as desired.

A block or support 60 constructed of insulating material, such as bakelite, is also fastened to the back plate 3 of the housing, there being a terminal plate 61 fixed to one face of the block or support 60 and carrying a contact thumb-screw 62. A conductor arm 63 is also mounted upon the block or support 60 and under tension of a spring 64 which surrounds a headed stud. The conductor arm has a contacting terminal 65. It is obvious that the tension of the coil spring on the headed stud may be increased or decreased by adjusting the stud, whereas the conducting thumb-screw 62 may also be adjusted to regulate the gap or the space between the terminal portion of the screw 62 and the contact 65. Secured to the ratchet 8 is a lug 67 constructed from suitable insulating material, such as bakelite, which, when the plunger of the solenoid is locked in its lower position, engages with the spring member 63 and holds the contacting terminal 65 out of engagement with the end of the conducting thumb-screw 62.

To place the invention in condition to operate, the rocker 44 is first actuated by the application of a pull to the wire 48. The rocker is thus brought into engagement with the contact 41, forcing it in turn into engagement with the contact 42. The electric control switch having then been closed (the switch being indicated at 82 in Figure 1 and comprising contacts 84 closed and opened by the movement of a slide 83) current will flow from the battery 79 through the switch 82 to the binding post 43. Thence it passes over the contacts 42 and 41 and the wire 69 to the spring 52 and, if the contacts 53 and 54 be in engagement (which will be the case if the device has been subjected to any vibration), it will pass over the spring 51, the conductors or wires 70 and 72, the switch 35, the terminal 39, the wire 73, through the wire comprising the bobbin of the solenoid, the wire 76, the binding post 75, the conductor or wire 80 to ground, returning to the negative terminal of the battery 79 which is grounded. The passage of current around the winding of the solenoid will energize the latter and elevate the core which, rising, will engage the U-shaped member 38 and disengage the switch 35 from the terminal 39, thus breaking the circuit on the winding of the magnet, since the switch and terminals are included in this circuit. But the elevation of the magnet core rocks the arm 11 and, therefore, rotates the ratchet wheel 8, disengaging the lug 67 from the spring 63 and permitting engagement of the contacts 65 and 62. Since the elevation of the plunger of the solenoid effects the breaking of the circuit on the winding thereof, the plunger immediately drops by gravity and thus restores the switch 35 into engagement with the terminal 39. At this time, however, the contacts 62 and 65 are in engagement and the magnet is, therefore, immediately reenergized, irrespective of any engagement or disengagement of the contacts 53 and 54. With the engagement of the contacts 62 and 65, a second circuit between the battery and solenoid is closed, current in this relation of the parts flowing from the battery 79 to the binding post 43, the contacts 42 and 41, the wires 69 and 81, the plate 61, the contacts 62 and 65, the spring plate 63, the terminal 71, the wire or conductor 72, the switch 35, the terminal 39, through the winding of the solenoid and back to the battery, as formerly. Thus the circuit on the solenoid is intermittently closed and broken each time the ratchet wheel is moved a specified angular distance until finally the lug 67 is reengaged with the spring 63 and separates the contact 65 from the screw 62, when further movement of the plunger is impossible unless the vibratory element effects the engagement of the contacts 53 and 54. Since it is the purpose that the signalling member be actuated intermittently in this operation, it is electrically connected in circuit with the springs 28 and 29. If the latter spring be depressed so that the contacts 31 and 30 are not in engagement, no current can reach the signalling device 27, but upon the elevation of the plunger, engagement of the two contacts is effected and the battery current then is available for the actuation of the signalling device, reaching the switch plate 35, as heretofore described, where it divides, part passing through the winding of the magnet and part over the wire 77 to the spring 28, thence over the contacts 30 and 31 and the spring 29 and thence over the wire 78 to the signalling device 27 and thence back to the battery.

The switch 82 is not a necessary element of the invention but may be employed and if so, is placed at some point, if used on a vehicle, where its position is known only to the owner or operater, as is also the actuating means for the wire 28 by means of which the rocker 44 is actuated. The actuation of the wire 48 so as to dispose the rocker with the angular arm in contact with the upper end of the plunger extension 19 will not only serve to keep the latter depressed but will permit opening of the circuit by the separation of the contacts 41 and 42. Also it effects separation of the contacts 30 and 31 and thus the signal actuating circuit is, if the switch 82 be employed, open at three distinct points so that inadvertent operation is a remote, if not an impossible, contingency.

The rocker 44, when engaged with the extension 21 of the plunger aside from precluding operation of the latter as when the vehicle on which the device is mounted is moving, also serves to prevent vibration of the weight 55, the upper end of the arm and rocker having a projection which engages the weight in the depressed or lowered position of the rocker.

The invention having been set forth, what is claimed is:

1. A theft alarm device comprising, in combination, a signal circuit including a switch for control of the signal, a solenoid provided with a movable core, a control switch in series with the solenoid, means for opening the signal control switch and for closing the switch in the solenoid circuit when the core moves in one direction with respect to the solenoid and for closing the signal control switch and opening the switch in series with the solenoid when the core moves in the opposite direction, a time limit cut off switch in series with the solenoid control switch, mechanical means for actuating the time limit cut off, also operatively connected to the electromagnetic device and a theft protective switch connected in shunt with the time limit cut off switch.

2. A theft alarm device comprising, in combination, a signal circuit including a switch for the control of the signal, an electromagnetic device for actuating the signal control switch, said device comprising a movable armature, a control switch for the electromagnetic device, means operated by the armature for intermittently operating the signal control switch, a time limit cut off mechanism for interrupting the circuit to the electromagnetic device, means for actuating the time limit cut off mechanism when the armature moves, and a theft protective switch connected in shunt with the time limit cut off mechanism.

3. A theft alarm device comprising, in combination, a signal circuit including a switch for the control of the signal, an electromagnetic device for actuating the signal control switch, said device comprising a movable armature, a control switch for the electromagnetic device, means operated by the armature for intermittently operating the magnet control switch and the signal control switch, a time limit cut off mechanism for interrupting the current to the electromagnetic device, means for actuating the time limit cut off mechanism when the armature moves, and a theft protective switch connected in shunt with the time limit cut off mechanism, said last named switch comprising two relatively movable, normally spaced contacts, one of which has a greater amount of inertia than the other.

4. A theft alarm device comprising, in combination, a signal circuit including a normally open switch for the control of the signal, an electromagnet having a movable armature, said armature when in one position engaging one member of the signal control switch and holding it in open position, a switch for the control of the electromagnet, said electromagnet control switch having a movable member, means comprising a lost motion connection for alternately opening and closing the electromagnetic control switch when the armature moves, a time limit cut off switch in series with the electromagnet control switch and a theft protective switch connected in shunt with the time limit cut off switch.

5. A theft alarm device comprising, in combination, a signal circuit including a normally open switch for the control of the signal, an electromagnet having a movable armature, said armature when in one position engaging one member of the signal control switch and holding it in open position, a switch for the control of the electromagnet, said electromagnet control switch having a movable member, means comprising a lost motion connection for alternately opening and closing the electromagnetic control switch when the armature moves, a time limit cut off switch in series with the electromagnetic control switch, means for actuating the time limit cut off switch also operatively connected with the armature, and a theft protective switch connected in shunt with the time limit cut off switch.

6. A theft alarm device comprising, in combination, a signal circuit including a normally open switch for the control of the signal, an electromagnet having a movable armature, said armature when in one position engaging one member of the signal control switch and holding it in open position, a switch for the control of the electromagnet, said electromagnet control switch having a movable member, means comprising a lost motion connection for alternately opening and closing the electromagnetic control switch when the armature moves, a time limit cut off switch in series with the electromagnet, control switch, means comprising a step by step mechanism for operating the cut off switch when the armature moves and a theft protective switch connected in shunt with the time limit cut off.

7. A theft alarm device comprising, in combination, a signal circuit including a normally open switch for the control of the signal, an electromagnet having a movable armature, said armature when in one position engaging one member of the signal control switch and holding it in open position, a switch for the control of the electromagnet, said electromagnet control switch having a movable member, means comprising a lost motion connection for alternately opening and closing the electromagnetic control switch when the armature moves, a time limit cut off switch in series with the electromagnet, control switch, means comprising a step by step mechanism for operating the cut off switch when the armature moves and a theft protective switch connected in shunt with the time limit cut off, said last named switch comprising two normally spaced relatively movable contacts, one of which has a larger inertia than the other.

In testimony whereof he affixes his signature.

ERNEST E. SCOTT.